United States Patent Office 3,661,873
Patented May 9, 1972

3,661,873
PROCESS AND PRODUCT OF TREATING LIVE POLYMERS WITH DIVINYL BENZENE AND A HALOALKANE
Adel F. Halasa, Bath, and Ervin E. Schroeder, North Canton, Ohio, assignors to The Firestone Tire & Rubber Company, Akron, Ohio
No Drawing. Continuation-in-part of application Ser. No. 716,345, Mar. 27, 1968. This application Jan. 6, 1971, Ser. No. 104,469
Int. Cl. C08d 5/04; C08f 27/02, 19/08
U.S. Cl. 260—85.1         18 Claims

ABSTRACT OF THE DISCLOSURE

The process described herein involves a method of converting relatively low molecular weight polymers of conjugated dienes prepared by alkali metal-catalyzed polymerizations, such as alkyllithium catalyzed polymerizations, and still containing active lithium or other alkali metal therein, by postreaction with a mixture of divinyl benzene and a haloalkane, such as carbon tetrachloride, to give higher molecular weight polymers having improved cold flow resistance, improved processability and green strength, etc. The improvements are much greater than can be effected by postreaction with either divinyl benzene or CCl$_4$ individually, or by having divinyl benzene present during the polymerization. The haloalkanes include chloro, bromo and iodo compounds and can have 1–4 or even more halogen atoms per molecule. The postreacted products are highly branched elastomers having a broad molecular weight distribution and possessing less cold flow than the polymers from which they are produced. Surprisingly, even though the molecular weight of the polymer is increased many times, the reaction product displays little or no tendency for cold flow even after extension with oil.

This application is a continuation-in-part of copending application Ser. No. 716,345, filed Mar. 27, 1968, and now abandoned.

BACKGROUND OF THE INVENTION

Field of the invention

This invention relates to a method for postreacting lithium-active polymers, or other alkali metal-active polymers, particularly diene-alkenyl-aryl copolymers, such as butadiene-styrene copolymers, with a mixture of divinyl benzene and a haloalkane of the class of chloroalkane, bromoalkane and iodoalkane, such as carbon tetrachloride, chloroform, sec.-butyl chloride, etc., thereby converting relatively low molecular weight active polymers to high molecular weight branched polymers having improved cold flow resistance.

Related prior art

It is known in the prior art to copolymerize butadiene and styrene in the presence of a small amount of divinyl benzene. For example, British Pat. No. 968,756 discloses such a process. However, considerable gel formation often results during continuous polymerization.

It is also known to postreact lithium-active polymers with silicon tetrachloride and the like. For example, U.S. Pat. No. 3,244,644 discloses such postreactions. U.S. Pat. No. 3,078,254 discloses a process for reacting polymers containing terminally positioned alkali metal with active-halogen-containing compounds such as bis(chloromethyl) ether, α,α,α-trichlorotoluene, 1,4-bis(chloromethyl) benzene, and the like. However in such cases coupling is insufficient to give the desired molecular weight without sacrifice of the desired processability and green strength.

SUMMARY OF THE INVENTION

In accordance with the present invention, it has now been found that lithium-containing polymers or other polymers containing active sodium, potassium, cesium or rubidium, such as butadiene-styrene copolymers prepared by alkyllithium catalyzed copolymerizations, can be converted to cold flow resistant polymers by postreaction with a mixture of divinyl benzene and a haloalkane, e.g. a chloroalkane, such as carbon tetrachloride.

The results obtained are improved over those obtained by postreaction with either individually. For example, with a lithium-active butadiene-styrene copolymer, the molecular weight can be increased without gelling to a high value, allowing the product to be extended with oil to increase the plasticity of the polymer to an appropriate range. Moreover, in view of this ability to increase the molecular weight so easily and so greatly, the molecular weight from the initial polymerization can be kept even lower than normal, and thereby permit easier handling.

While the postreactions of the prior art with silicon tetrachloride and bis(chloromethyl) ether and other active-halogen-containing compounds are in effect coupling reactions, it is believed that the postreaction of the present invention is different from and effects much greater improvement in the polymers than can be effected by mere coupling. While it is not intended that the inventors be committed to any particular theory, it is believed that the chloroalkane or other haloalkane acts as an activator in cross-linking the alkali metal-active polymers with the divinyl benzene. Still the cross-linking is controlled in a manner to give desirable molecular weights and desirable molecular weight distribution. This is supported by the fact that the type of product produced and the properties of the product are different from what would be expected from coupling.

The processability and green strength of the postreacted polymer are much better than for a linear polymer of corresponding plasticity. Consequently, the ultimate elastomer composition has improved coldflow resistance, improved processability and green strength. "Green strength" is known in the rubber art as the cohesive strength of an unvulcanized rubber or rubber composition and the resistance it shows to being pulled apart.

Also, an advantage of the postreaction process of this invention is that a relatively low molecular weight elastomer, such as a butadiene-styrene copolymer having a high plasticity, can be reacted to give a product having a plasticity considerably lower than is required for ultimate use. The improved properties of the postreacted product permit oil extension to increase the plasticity to the desired range.

The postreaction of this invention is advantageously performed at a temperature in the range of −50° to 150° C., preferably 20–120° C., using a polymer containing 0.1–10 millimoles of Li in the form of C—Li, or other alkali metal, preferably, 0.4–0.8 millimole per 100 parts of polymer. The haloalkane compound is used in a proportion of 0.1–100 millimoles of halogen, preferably 0.25–10 millimoles per 100 parts of polymer. The amount of divinyl benzene is advantaegously at least 0.01, preferably at least 0.1 millimole per 100 parts by weight of the polymer, preferably equimolar with the halogen, and preferably no more than 5.

The postreacted product of this invention has a desirable molecular weight distribution as indicated by gel permeation chromatography (GPC) determined according to standard tests as described in the literature.

While copolymers of all proportions of diene and monovinyl aromatic compounds are broadly embraced by the invention, it is preferred that the copolymers contain from about 5 to about 50% monovinyl aromatic compound and corresponding from about 95 to about 50% butadiene-1,3 or other diene.

Suitable alkenyl aryl compounds for preparing the lithium-active or other alkali metal-active polymers are represented by the formula

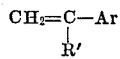

wherein R' represents hydrogen or methyl, so that the alkenyl group includes vinyl and α-methylvinyl or isopropenyl, and Ar represents phenyl, naphthyl and the alkyl, cycloalkyl, aryl, alkaryl, aralkyl, alkoxy, aryloxy and dialkylamino derivatives of phenyl and naphthyl, with the total number of carbon atoms in the derivative groups not exceeding 12.

Various alkenyl aryl compounds that can be used include: styrene, α-methylstyrene, 1-vinylnaphthalene, 2-vinylnaphthalene, α-methylvinylnaphthalene and alkyl, cycloalkyl, aryl, alkaryl, aralkyl, alkoxy, aryloxy and dialkylamino derivatives thereof in which the total number of carbon atoms in the combined substituents is generally not greater than 12. Examples of these aromatic monomers include:

4-isopropenyltoluene
3-methylstyrene (3-vinyltoluene)
3,5-diethylstyrene
4-n-propylstyrene
2,4,6-trimethylstyrene
4-dodecylstyrene
3-methyl-5-n-hexylstyrene
4-cyclohexylstyrene
4-phenylstyrene
2-ethyl-4-benzylstyrene
4-p-tolylstyrene
3,5-diphenylstyrene
2,4,6-tri-tert.-butylstyrene
2,3,4,5-tetramethylstyrene
4-(4-phenyl-n-butyl)styrene
3-(4-n-hexylphenyl)styrene
4-methoxystyrene
3,5-diphenoxystyrene
3-decylstyrene
2,6-dimethyl-4-hexosystyrene
4-dimethylaminostyrene
3,5-diethylaminostyrene
4-methoxy-6-di-c-propylamniostyrene
4,5-dimethyl-1-vinylnaphthalene
3-ethyl-1-vinylnaphthalene
6-isopropyl-1-vinylnaphthalene
2,4-diisopropyl-1-vinylnaphthalene
3,6-di-p-tolyl-1-vinylnaphthalene
6-cyclohexyl-1-vinylnaphthalene
4,5-diethyl-8-octyl-1-vinylnaphthalene
3,4,5,6-tetramethyl-1-vinylnaphthalene
3,6-di-n-hexyl-1-vinylnaphthalene
8-phenyl-1-vinylnaphthalene
5-(2,4,6-trimethylphenyl)-1-vinylnaphthalene
3,6-diethyl-2-vinylnaphthalene
7-dodecyl-2-vinylnaphthalene
4-n-propyl-5-n-butyl-2-vinylnaphthalene
6-benzyl-2-vinylnaphthalene
3-methyl-5,6-diethyl-8-n-propyl-2-vinylnaphthalene
4-o-tolyl-2-vinylnaphthalene
5-(3-phenyl-n-propyl)-2-vinylnaphthalene
4-methyl-1-vinylnaphthalene
6-phenyl-1-vinylnaphthalene
3,6-dimetylamino-1-vinylnaphthalene
7-dihexyl-2-vinylnaphthalene
4-methyl-α-methylstyrene
2-ethyl-5-isopropenylstyrene The dienes suitable for preparing lithium-active or other alkali metal-active polymers for use in the practice of this invention can be represented by the formula

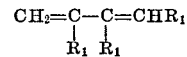

wherein $R_1$ represents hydrogen and alkyl or an aryl radical, preferably one having no more than 7 carbon atoms.

In addition to butadiene-1,3- the various other conjugated dienes that can be used include isoprene, 2,3-dimethyl-1,3-butadiene, 1,3-pentadiene (piperylene), 2-methyl-3-ethyl-1,3-butadiene, 3-methyl-1,3-pentadiene, 2-methyl-3-ethyl-1,3-pentadiene, 2-ethyl-1,3-pentadiene, 1,3-hexadiene, 2-methyl-1,3-hexadiene, 1,3-heptadiene, 3-methyl-1,3-heptadiene, 1,3-octadiene, 3-butyl-1,3 - octadiene, 3,4-dimethyl-1,3-hexadiene, 3-n-propyl-1,3-pentadiene, 4,5-diethyl-1,3-octadiene, phenyl-1,3-butadiene, 2,3-diethyl-1,3-butadiene, 2,3-di-n-propyl-1,3 - butadiene, 2-methyl-3-isopropyl-1,3-butadiene, and the like. Combinations of two or more of such dienes can be used to make copolymers, such as butadiene with isoprene, butadiene with isoprene and styrene, butadiene with piperylene, butadiene wtih piperylene and styrene, isoprene with piperylene and various other such combinations.

The preferred catalysts for the polymerizations used in preparing the lithium-active polymers suitable for use in this invention are alkyllithium compounds, but the hydrocarbon lithium compounds are generally operable to produce the improved polymers of the invention and are hydrocarbons having, for example, from 1 to 40 carbon atoms in which lithium has replaced hydrogen. Suitable lithium hydrocarbons include, for example, alkyl lithium compounds such as methyl lithium, ethyl lithium, butyl lithium, amyl lithium, hexyl lithium, 2-ethylhexyl lithium, n-dodecyl lithium and n-hexadecyl lithium. Unsaturated litium hydrocarbons are also operable, such as allyl lithium, methallyl lithium and the like. Also operable are the aryl, alkaryl and aralkyl compounds, such as phenyl lithium, the several tolyl and xylyl lithiums, alpha- and beta-naphthyl lithium and the like. While lithium catalysts are preferred for this purpose, the other alkali metals can be used, i.e. sodium, potassium, cesium and rubidium and compounds of these corresponding to the lithium compounds listed herein are likewise suitable.

Mixtures of such hydrocarbon lithium compounds may also be employed. For example, desirable catalysts may be prepared by reacting an initial hydrocarbon lithium compound successively with an alcohol and then with an olefin such as isopropylene (a technique analogous to the "Alfin" technique), whereby a greater or lesser proportion of the lithium from the initial hydrocarbon goes to form lithium alkoxide and to form a new organo-lithium compound with the olefin.

Surprisingly, the catalytic action of the hydrocarbon lithium catalysts employed to produce the polymers of the invention does not appear to be affected by the presence of salts of other alkali metals as impurities. For instance, in the synthesis of hydrocarbon alkali metal compounds, alkali metal halides are produced as by-products, while in catalysts produced by the "Alfin" technique, alkali metal alkoxides are formed. Where in these polymerization reactions alkali metals other than lithium are employed, either in the form of the metal alone or in alkali metal hydrocarbons, these extraneous compounds exert a different effect upon the structure produced.

Also suitable for this purpose are the other anionic polymerization catalysts listed in U.S. Pats. Nos. 3,317,918 and 3,170,903 such as the polylithium hydrocarbons, lithium dihydrocarbon amides, metallic lithium, salt mixtures with colloidally dispersed lithium metal, composites of a fluorine-containing salt and lithuim metal or lithium hydrocarbon, and lithium adducts of polynuclear aromatic hydrocarbons such as naphthalene, diphenyl and anthracene.

It is essential that air be excluded during the preparation of all of the catalyst materials described. Thus, whether the catalyst be lithium metal or lithium-containing compounds it is necessary that the catalyst be prepared in closed containers provided with means for exclusion of air. Preferably, the catalyst will be employed shortly after preparation, although the catalyst may be stored for reasonable periods of time if substantial contact with the atmosphere is prevented during removal from the vessel in which the catalyst is prepared, during storage and during subsequent introduction into the reaction chamber. As will be illustrated, the catalyst often may be produced in situ in the reaction vessel.

In general, the larger the amount of catalyst used, the more rapidly the polymerization will proceed at a given temperature, and the lower the molecular weight of the resulting product. Desirably, sufficient catalyst should be employed to provide from about 0.1 to 100 gram millimoles of active metal for each 100 grams of monomer in the polymerization mixture.

Since moisture tends to use up catalyst, it should be excluded from the reaction zone insofar as is possible. Oxygen, nitrogen and other components of the air seriously inhibit the desired polymerization reaction and consequently should be excluded from the reaction zone. In laboratory or small scale equipment, all of these substances conveniently may be removed by bringing the polymerization charge to a boil and venting a small proportion of the charge (e.g., about 10%) prior to sealing the reactor and effecting polymerization. In large scale production, however, charging of the reactor is preferably conducted under an inert atmosphere.

It has been found that the molecular weight and proportion of cis-1,4 structure of the copolymers generally increase as the temperature of polymerization is decreased. Additionally, the reaction is quite difficult to control at elevated temperatures, particularly where monomer of the preferred highest purity is employed. It has also been found that gel content increases as higher polymerization temperatures are employed, especially with lithium-containing catalysts. Consequently, it is desirable to operate at the lowest temperature at which a practical yield of the desired product may be obtained. Since polymerization reactions of the type contemplated ordinarily require a considerable induction period, it is often desirable to initiate the polymerization reaction at a higher temperature and then lower the temperature to the desired level by suitable cooling means once the polymerization reaction has been initiated. In this manner, the induction period will be lessened and the benefits of low temperature polymerization, as above indicated, may be obtained. In general, lithium-active copolymers suitable for use in this invention are advantageously produced at temperatures between 0° C. and 150° C. A polymerization temperature of from 40° to 70° C. is preferred.

The polymerization is advantageously performed in a non-polar, non-acidic solvent, preferably a hydrocarbon such as those illustrated below. While the polymerization can be performed without solvent, in which case the polymerization product is deposited as a rubbery mass or the polymerization can be terminated well before completion in order to have unreacted monomer serve as suspension medium, generally about 25–50% by volume of solvent is used, based on the total volume.

Solvents operable in the preparation of the lithium-active or other alkali metal-active polymers must be non-polar, non-acidic, organic substances. Suitable solvents include the saturated aliphatic hydrocarbon solvents, such as the straight and branched chain paraffins and cycloparaffins containing from 3 to 16 carbon atoms which include, without limitation, propane, pentane, hexane, petroleum ether, heptane, dodecane, cyclopentane, cyclohexane, methyl cyclohexane, and the like. Aromatic solvents such as benzene, toluene, xylene, and the like are also operable. Mono-olefins can also be used as solvents when a catalyst system is used for which the olefin is immune to polymerization. For example as pointed out above the alpha olefins are immune to polymerization with n-Bu lithium unless combined with a chelating compound such as sym.-dimethyl ethylenediamine. Therefore in the absence of such an effective catalyst system, olefins can be used as solvents, including butylenes, amylenes, hexenes, cyclohexene and the like.

The same considerations as to purity and absence of interfering compounds applying to the monomers also apply to the solvent. A treatment which has been found particularly advantageous for the purification of paraffin solvents, such as petroleum ether, consists of agitating the solvent with concentrated sulfuric acid and thereafter repeatedly washing with water. The solvent may then be suitably dehydrated by passage through silica gel, alumina, calcium chloride or other dehydrating or absorbing media, and thereafter distilled. As in the case of the monomer, the solvent after being purified desirably should be handled in contact only with its own vapor or with atmospheres containing only its vapor and inert gases such as helium and argon.

Laboratory scale polymerization reactions producing lithium-active or other alkali metal-active polymers may conveniently be conducted in glass beverage bottles sealed with aluminum lined crown caps. The polymerization bottles should be carefully cleaned and dried before use. The catalyst employed may be added to the bottle by weight, or, where possible, the catalyst can be melted and added by volume. In some instances, it is desirable to add the catalyst as a suspension in the monomer or solvent. The monomer is added by volume, desirably employing sufficient excess so that about 10% of the charge can be vented to remove moisture, oxygen and air from the bottle. The removal of oxygen from the free air space above the monomer in the polymerization bottle as well as dissolved oxygen in the monomer is an important step in the bottle loading procedure. The cap is placed loosely on the bottle and the monomer is brought to a vigorous boil as by placing the bottle on a heated sand bath. When approximately 10% of the charge has been vented, the bottle is rapidly sealed. Such procedure substantially excludes the air and oxygen which drastically inhibit polymerization.

The sealed bottles may be placed on a polymerization wheel immersed in a liquid maintained at a constant temperature, and rotated. Alternatively, the charge bottle may be allowed to stand stationary in a constant temperature bath or otherwise heated or cooled until the polymerization reaction is complete. Ordinarily, the static system which requires a considerably longer reaction, may in some instances be attractive where higher molecular weights are desired. After the induction period, the charge goes through a period of thickening and finally becomes solid. At the end of the polymerization reaction, when properly conducted, all of the monomer has been consumed and there is a partial vacuum in the free space of the reaction vessel.

The time for completion of polymerization varies with the temperature, the time required decreasing with increase in temperature, in any case being completed within 3–4 hours and at the highest temperatures in the cited range susbtantial polymerization is effected within ½ hour.

After polymerization has been completed, and the bottle cooled to handling temperature, the polymer may be removed by cutting the bottle open. Precautions should be taken to avoid destruction of the C—Li structure prior to the addition of the haloalkane and dialkenyl monomer.

Small and large scale polymerizations can also be run in stainless steel stirred reactors.

Corresponding techniques are employed in large scale polymerization processes. Usually the reaction will be carried out in a closed autoclave provided with a heat transfer jacket and a rotary agitator. Avoiding of oxygen contamination is most easily secured by evacuating the vessel prior to to charging the monomer (and solvent, if used) and employing an inert atmosphere. To insure the purity of the monomer and solvent, a silica gel or other suitable adsorption column is preferably inserted in the charging line employed for introduction of these materials to the reactor. The catalyst is preferably charged last, conveniently from an auxiliary charging vessel pressured with an inert gas and communicating with the polymerization vessel through a valved conduit. It is desirable to provide a reflux condenser to assist in the regulation of the reaction temperature.

In addition to divinyl benzene other dialkenyl aryl compounds can be used in the practice of this invention, although they are more expensive and not so easily available. These include divinyl naphthalene, divinyl diphenyl, divinyl toluene, divinyl xylene, divinyl anisole, divinyl ethyl benzene, divinyl chlorobenzene, divinyl methylnaphthalene, divinyl ethylnaphthalene, divinyl methyldiphenyl, divinyl ethyldiphenyl, etc.

The haloalkanes that can be used in the practice of this invention include those which have at least one atom of chlorine, bromine or iodine per molecular and can have any number of halogen atoms per molecule, although generally there is no particular advantage of having more than 4 or 5. Particularly desirable haloalkanes for the purpose of this invention are carbon tetrachloride, chloroform, 2-chlorobutane, etc. At least one of the halogen atoms is attached to an aliphatic carbon, although there can also be aromatic hydrocarbon portions in the molecule if at least 2 carbon atoms removed from the halogen, and there can also be halgen substituted on such aromatic portions. The aliphatic portion is advantageously saturated. While there is no particular limit in the molecular size of the haloalkane since even polymeric materials can be satisfactorily used, there is no particular advantage in having more than 30 carbon atoms, preferably no more than 10 carbon atoms per molecule.

Typical haloalkanes that can be used include, but are not restricted to the following: 1-chloropropane, 2-chloropropane, 1-n-chlorobutane, 2-chloro-n-butane, 1-chloro-2-methylpropane, 1,3-dichloro-2-methylpropane, 2-chloro-n-pentane, 2,4-dichloro-n-pentane, 2-chloro-3-methyl-n-butane, 2,3,4-trichloro-n-hexane, a mixture of chlorinated dodecanes having an average of two chlorine atoms per molecule, a polyvinyl chloride having a molecular weight of about 1000, cyclohexyl chloride, cyclohexylmethyl chloride, cycloheptyl chloride, etc., tetrabromomethane, tribromomethane, dibromoethane, tribromoethane, 1-bromopropane, 2-bromopropane, 1-bromo-n-butane, 2-bromo-n-butane, 1-iodo-2-methylpropane, 1,3-bromo-2-methylpropane, 2-iodo-n-pentane, 2,4-diiodo-n-pentane, 2-bromo - 3 - methyln-n-butane, 2,3,4-tribromo-n-hexane, a mixture of brominated dodecanes having an average of two bromine atoms per molecule, cyclohexyl bromide, cyclohexylmethyl iodide, cycloheptyl bromide, etc.

Although other substituent groups can also be present in the haloalkane provided they are inactive under the conditions and with the various reagents present so as not to interfere with the desired reaction, there is no particular advantage in having such other substituent groups since they add nothing to the reaction.

The invention is illustrated by the following examples. These examples are given for purpose of illustration and are not intended in any way to restrict the scope of the invention nor the manner in which it can be practiced. Unless specified otherwise, parts and percentages are given by weight.

EXAMPLE I

In batch preparation "live" butadiene polymer is prepared in a 2-quart stainless steel reactor equipped with stirrer and adapted for removal of samples. A mixture of 250 parts of butadiene and 1220 parts of hexane (calculated to give a polymerization product containing 17% solids) is introduced into the reactor. The temperature is raised to 120° F. after which 0.555 millimole of n-butyllithium per 100 parts of monomer is introduced. After 3 hours at this temperature, a sample is removed and the percent solids determined by evaporation of solvent. When such sample testing shows a conversion of 98–100%, the "live" polymer is ready for postreaction. The amount of polymer remaining in the reatctor is calculated by substracting from the original amount of monomer the amount removed as polymer in the sample testing. From this, the proportionate amount of polymeric lithium remaining in the reactor is also calculated. The reactor temperature is then raised to 175° F. (79° C.) and the haloalkane and divinyl benzene are added, preferably in a proportion of one or of 6 millimoles of haloalkane and of 0.23 or of 0.09 millimole of divinyl benzene per millimole of active lithium in the polymer. A series of experiments are performed in which sec.-chloro-n-butane and divinyl benzene are used. In each experiment the combination of postreactants are added and allowed to react with the live or lithium-active polymer and samples are removed for a determination of polymer viscosity at 1, 2 and 3 hour intervals to determine the progress of the postreaction.

A control experiment using 0.23 millimole of divinyl benzene as the only postreagent shows after 1 hour an increase in viscosity of an initially soft polymer to a more viscous polymer but one capable of being milled and processed; the polymer increases in viscosity only slightly after further reaction times of two and three hours. After two hours a second sample of an initially soft polymer increases in viscosity to a value approximately twice that of the control polymer as the result of adding 1 millimole of the haloalkane as a second reagent. When the amount of haloalkane is raised to 6 millimoles, a similar high viscosity is reached in about 1 hour. In another experiment using 6 millimoles of the haloalkane and only 0.09 millimole of divinyl benzene the increases in viscosity after 1 and 2 hours substantially match those of the control experiment but after 3 hours substantially exceed the control value while still retaining easy processability.

EXAMPLE II

In a continuous process a lithium-active polymer is fed to a centrifugal pump, which serves as a mixer, and the haloalkane and the divinyl benzene are added to the polymer solution in the pump as a single solution in an inert solvent such as hexane. The solution of the two postreactants is prepared by first drying the solvent with a desiccant to prevent undesirable side reactions with the alkali metal. The divinyl benzene is likewise dried and added to the hexane, and the haloalkane, after drying if necessary, is also added to the hexane. The two reactants are mixed in the concentrations or proportions desired for ultimate postreaction. The rate of addition of the reactant is controlled to give the desired ratio of the reactants to the amount of lithium contained in the polymer. The resultant solution is fed from the centrifugal pump to a reactor provided with agitation and means for maintaining a temperature of 180–200° F. (82–93° C.) for a sufficient residence time to complete the postreaction.

EXAMPLE III

The procedure of Example II is followed in a number of experiments using a butadiene-styrene copolymer having approximately 25% styrene therein and about 1% active lithium. Solutions of postreactants are used which have carbon tetrachloride and divinyl benzene in varying ratios to each other and these are fed in at a controlled rate to give the desired proportion based on the amount of active lithium in the polymer. The runs are tabulated in Table I, showing proportions and results obtained with a one hour residence time in the reactor. Controls are run using no postreactants and in the other experiments 0.03 millimole of divinyl benzene is used with varying percentages of carbon tetrachloride as indicated in the table, the percentage of carbon tetrachloride being given as a percentage of the amount of carbon tetrachloride calculated to be the equivalent of the active lithium contained in the polymer. The relative viscosities at various stages are also reported in Table I.

TABLE I

| Copolymer used: | DVB (parts per hundred) | $CCl_4$, percent [1] | Relative viscosity |
|---|---|---|---|
| A | 0 | 0 | 1 |
| A | 0.03 | 30 | 3 |
| A | 0.03 | 100 | 6 |
| B | 0 | 0 | 1 |
| B | 0.03 | 30 | 3 |
| B | 0.03 | 100 | 6 |
| C | 0 | 0 | 1 |
| C | 0.03 | 30 | 3 |
| C | 0.03 | 120 | 6 |
| D | 0 | 0 | 1 |
| D | 0.03 | 80 | 5+ |
| D | 0.03 | 100 | 8 |
| E | 0 | 0 | 1 |
| E | 0.015 | 80 | 4 |
| E | 0.015 | 120 | 6 |
| F | 0 | 0 | 1 |
| F | 0.015 | 80 | 1+ |
| F | 0.015 | 120 | 3 |

[1] Based on equivalents of active lithium in the polymer.

EXAMPLE IV

A styrene-butadiene copolymer is prepared using n-butyllithium as catalyst to produce a copolymer having 18% styrene and 1% active lithium therein, and having a dilute solution viscosity of 1.5. This copolymer is used in a series of tests to determine the effect of carbon tetrachloride and divinyl benzene as postreactants individually and in combination in accordance with the procedure described in Example III. The various proportions used and the results obtained are summarized below in Table II.

TABLE II

| Percent $CCl_4$ | Percent DVB | Original | Post-reacted |
|---|---|---|---|
| 0.2 | 0 | 1 | 3 |
| 0.2 | 0.015 | 1 | [1] 4 |
| 0.2 | 0.04 | 1 | [1] 5 |

[1] Very good processibility in comparison to control.

EXAMPLE V

The procedure of Example I is repeated a number of times using individually the following lithium-active polymers in place of the lithium-active butadiene polymer of Example I:

Polyisoprene
Polystyrene
Polyvinylnaphthalene
Polybutene-1
Polymethylmethacrylate
Polyvinylacetate
Polyalphamethyl styrene
Polyallylmethylphthalate
Polyvinylmethylether
Butadiene-isoprene (50-50 copolymer)
Butadiene-piperylene (75-25 copolymer)
Acrylonitrile-vinyl acetate (50-50 copolymer)
Isoprene-styrene (75-25 copolymer)

In each instance improved properties are noted with respect to higher molecular weight and improved extrudability when the combination of postreactants is used.

EXAMPLE VI

The procedure of Example I is repeated a number of times using individually in place of the sec.-chloro-n-butane of that example an equivalent amount of the following haloalkanes respectively:

Chloroform
Bromoform
Iodoform
1,3-dichloro-2-methyl-propane
2,3,4-trichloro-n-hexane
A mixture of chlorinated dodecanes having an average of 2 chlorine atoms per molecule
A polyvinyl chloride having a molecular weight of about 1000
Phenethyl chloride
2-bromo-n-butane
2-iodo-n-pentane
Cyclohexyl chloride
Cycloheptyl bromide In each case improvement is noted in higher molecular weight and in extrudability when the respective combination of postreactants is used.

EXAMPLE VII

The procedure of Example II is repeated a number of times using individually in place of the divinyl benzene of that example an equivalent amount individually of the following dialkenyl monomers:

Divinyl naphthalene
Diisopropenyl benzene
Diallyl benzene
Divinyl diphenyl

In each case improvement is noted in higher molecular weight and extrudability when the combination of postreactants is used.

EXAMPLE VIII

The procedure of Example II is repeated a number of times using in place of the lithium-active polymer of that example a corresponding polymer which has been formed so as to give the corresponding sodium-active polymer, potassium-active polymer, cesium-active polymer, rubidium-active polymer, by using the corresponding alkali metal n-butyl compound to catalyze the polymerization. In each case the postreacted product is notably improved in molecular weight and processability as noted above.

The novel polymers can be blended with other known polymers to provide useful commercial compositions for fabrication into useful shapes and articles. The novel rubbery polymers are advantageously blended with known rubbers (e.g., natural rubber, SBR, BR, IR, IIR, CR, ISR), with or without extending oils, for forming vulcanizates of great technical importance. The novel rubbery polymers are advantageously compounded with the known reinforcing carbon blacks to produce useful commercial stocks, which may also contain one or more additional rubbery polymers, and may also contain 5 to 100 phr. (parts per 100 parts of the rubber) of extending oil or plasticizer. Sulfur and other known vulcanizing agents for natural rubber and the commercial synthetic rubbers are useful for forming vulcanizable stocks containing a novel polymer of the invention. Known antioxidants, stabilizers and antiozonants for natural and commercial synthetic rubbers find similar utility in compositions containing the novel polymers of the invention. Known methods of mixing, forming, fabricating and curing compositions of natural and commercial synthetic rubbers are applicable to and useful with compositions containing the novel polymers of the invention. The novel polymers of the invention are especially useful in pneumatic tire tread, sidewall and carcass compositions, and the considerations of this paragraph are especially relevant to the use of the novel polymers in tires.

While certain features of this invention have been described in detail with respect to various embodiments thereof, it will, of course, be apparent that other modifications can be made within the spirit and scope of this invention and it is not intended to limit the invention

The invention claimed is:

1. A process for increasing the molecular weight while retaining processability of the resultant polymer comprising the steps of reacting an alkali metal-active polymer of a conjugated diene containing 0.1–10 millimoles of alkali metal attached to said polymer per 100 parts of polymer, at a temperature of −50° to 150° C. with an intimate mixture of a haloalkane and divinyl benzene, said haloalkane being used in a proportion to give 0.1–100 millimoles of halogen per 100 parts of polymer and said divinyl benzene being used in a proportion of at least 0.01 millimole per 100 parts by weight of polymer, said reaction being conducted for at least one minute, said conjugated diene polymer being selected from the class consisting of homopolymers and copolymers with alkenyl aryl monomers having the following formula $CH_2=C(R')-Ar$ where $R'$ represents hydrogen or methyl and Ar represents phenyl, naphthyl and derivatives thereof in which the total of said derivative groups have no more than 12 carbon atoms and are selected from the class consisting of alkyl, cycloalkyl, aryl, alkaryl and aralkyl radicals, said alkenyl aryl monomer representing no more than 50 percent by weight of the copolymer molecules.

2. The process of claim 1 in which said reaction is conducted for at least one hour.

3. The process of claim 1 in which said reaction is conducted until there has been at least 50 percent increase in molecular weight.

4. The process of claim 1 in which said temperature is 20–120° C.

5. The process of claim 1 in which said alkali metal is lithium.

6. The process of claim 1 in which said alkali metal is present in said polymer in a proportion of 0.4 to 0.8 millimole per 100 parts by weight of said polymer.

7. The process of claim 1 in which said haloalkane is used in a proportion of 0.25–10 millimoles per 100 parts by weight of polymer.

8. The process of claim 1 in which said divinyl benzene is used in an amount approximately equimolar with the halogen.

9. The process of claim 1 in which said polymer is polybutadiene.

10. The process of claim 1 in which said polymer is a copolymer of butadiene and styrene containing 5–50 percent by weight of styrene copolymerized therein.

11. The process of claim 1 in which said haloalkane is carbon tetrachloride.

12. The process of claim 1 in which said alkali metal is lithium and said polymer is a polymeric butadiene.

13. The process of claim 12 in which said haloalkane is carbon tetrachloride.

14. The process of claim 12 in which said haloalkane is sec.-chloro-n-butane.

15. The process of claim 12 in which said polymeric butadiene is a butadiene-styrene copolymer having 5–50 percent by weight styrene copolymerized therein.

16. The process of claim 12 in which said polymeric butadiene is polybutadiene.

17. The process of claim 1 in which said polymer is polyisoprene.

18. A polymer produced according to the process of claim 1.

References Cited

UNITED STATES PATENTS

| | | | |
|---|---|---|---|
| 3,135,716 | 6/1964 | Uraneck et al. | 260—83.7 |
| 3,231,635 | 1/1966 | Holden et al. | 260—880 |
| 3,280,084 | 10/1966 | Zelinski | 260—83.7 |
| 3,383,377 | 5/1968 | Uraneck et al. | 260—94.7 |
| 3,435,011 | 3/1969 | Uraneck et al. | 260—80.7 |

FOREIGN PATENTS

| | | | |
|---|---|---|---|
| 1,025,295 | 4/1966 | Great Britain | 260—880 |

JAMES A. SEIDLECK, Primary Examiner

U.S. Cl. X.R.

260—947 HA, 880 R

PO-1050
(5/69)

UNITED STATES PATENT OFFICE
CERTIFICATE OF CORRECTION

Patent No. __3,661,873__   Dated __May 9, 1972__

Inventor(s) __Adel F. Halasa and Ervin E. Schroeder__

It is certified that error appears in the above-identified patent and that said Letters Patent are hereby corrected as shown below:

Col. 1, line 67, "Pat. No. 3,244,644" should read
--Pat. No. 3,244,664--

Col. 3, line 72, "dimetyl" should read --dimethyl--

Col. 7, line 54, "methyln" should read --methyl--

Signed and sealed this 26th day of December 1972.

(SEAL)
Attest:

EDWARD M. FLETCHER, JR.
Attesting Officer

ROBERT GOTTSCHALK
Commissioner of Patents